US011669473B2

(12) United States Patent
Vishnu et al.

(10) Patent No.: US 11,669,473 B2
(45) Date of Patent: Jun. 6, 2023

(54) ALLREDUCE ENHANCED DIRECT MEMORY ACCESS FUNCTIONALITY

(71) Applicant: Advanced Micro Devices, Inc., Santa Clara, CA (US)

(72) Inventors: Abhinav Vishnu, Austin, TX (US); Joseph Lee Greathouse, Austin, TX (US)

(*) Notice: Subject to any disclaimer, the term of this patent is extended or adjusted under 35 U.S.C. 154(b) by 0 days.

(21) Appl. No.: 17/032,195

(22) Filed: Sep. 25, 2020

(65) Prior Publication Data
US 2021/0406209 A1    Dec. 30, 2021

Related U.S. Application Data (60) Provisional application No. 63/044,606, filed on Jun. 26, 2020.

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 6,000,024 A | 12/1999 | Maddox | |
| 7,827,385 B2 | 11/2010 | Almasi et al. | |
| 8,161,268 B2 | 4/2012 | Faraj | |
| 8,752,051 B2 | 6/2014 | Archer et al. | |
| 9,432,298 B1* | 8/2016 | Smith | H04L 49/9057 |
| 10,608,640 B1* | 3/2020 | Orthner | H03K 19/17796 |
| 2009/0327464 A1* | 12/2009 | Archer | G06F 15/173 709/223 |
| 2013/0097600 A1* | 4/2013 | Cardona | G06F 9/45558 718/1 |
| 2015/0106560 A1* | 4/2015 | Perego | G06F 12/0246 711/105 |
| 2015/0143037 A1* | 5/2015 | Smith | G06F 3/0659 711/103 |
| 2015/0370700 A1* | 12/2015 | Sabol | G06F 3/0688 711/103 |
| 2016/0182154 A1* | 6/2016 | Fang | H04B 10/2575 398/116 |

(Continued)

*Primary Examiner* — Henry Tsai
*Assistant Examiner* — Christopher A Bartels
(74) *Attorney, Agent, or Firm* — Kowert Hood Munyon Rankin and Goetzel PC; Rory D. Rankin (57) ABSTRACT

Systems, apparatuses, and methods for performing an allreduce operation on an enhanced direct memory access (DMA) engine are disclosed. A system implements a machine learning application which includes a first kernel and a second kernel. The first kernel corresponds to a first portion of a machine learning model while the second kernel corresponds to a second portion of the machine learning model. The first kernel is invoked on a plurality of compute units and the second kernel is converted into commands executable by an enhanced DMA engine to perform a collective communication operation. The first kernel is executed on the plurality of compute units in parallel with the enhanced DMA engine executing the commands for performing the collective communication operation. As a result, the allreduce operation may be executed in parallel on the enhanced DMA engine to the compute units.

20 Claims, 8 Drawing Sheets

(56) References Cited

U.S. PATENT DOCUMENTS

| | | | |
|---|---|---|---|
| 2016/0344629 A1* | 11/2016 | Gray | H04L 49/106 |
| 2017/0041271 A1* | 2/2017 | Tal | G06Q 10/10 |
| 2017/0041304 A1* | 2/2017 | Tal | H04W 12/50 |
| 2017/0041388 A1* | 2/2017 | Tal | G06F 40/279 |
| 2017/0187846 A1* | 6/2017 | Shalev | G06F 15/17331 |
| 2017/0212784 A1* | 7/2017 | Johnsen | H04L 49/358 |
| 2018/0074843 A1* | 3/2018 | Smith | G06F 9/45558 |
| 2018/0089115 A1* | 3/2018 | Schmisseur | G06F 13/1694 |
| 2018/0191523 A1* | 7/2018 | Shah | G06F 13/40 |
| 2019/0073265 A1* | 3/2019 | Brennan | G06F 3/061 |
| 2019/0102171 A1* | 4/2019 | Tashiro | G06F 9/3016 |
| 2019/0102346 A1* | 4/2019 | Wang | G06F 16/906 |
| 2019/0303297 A1* | 10/2019 | Fleming, Jr. | G06F 12/0853 |
| 2019/0347125 A1* | 11/2019 | Sankaran | G06F 9/3859 |
| 2019/0370084 A1* | 12/2019 | Behar | G06F 9/5083 |
| 2019/0385057 A1* | 12/2019 | Litichever | H04L 63/14 |
| 2020/0042362 A1* | 2/2020 | Cui | G06K 9/6274 |
| 2020/0104275 A1* | 4/2020 | Sen | G06F 9/541 |
| 2020/0137896 A1* | 4/2020 | Elenitoba-Johnson | G06F 13/4221 |
| 2020/0151104 A1* | 5/2020 | Yang | G06F 13/1668 |
| 2020/0167098 A1* | 5/2020 | Shah | G06F 3/0679 |
| 2020/0257517 A1* | 8/2020 | Seater | G06F 1/3287 |
| 2021/0084787 A1* | 3/2021 | Weldon | G06F 3/06 |
| 2021/0092069 A1* | 3/2021 | Musleh | G06N 3/084 |
| 2021/0117360 A1* | 4/2021 | Kutch | G06F 13/4027 |
| 2021/0133583 A1* | 5/2021 | Chetlur | G06N 3/084 |
| 2021/0232528 A1* | 7/2021 | Kutch | G06F 9/44505 |

* cited by examiner

ALLREDUCE ENHANCED DIRECT MEMORY ACCESS FUNCTIONALITY

CROSS REFERENCE TO RELATED APPLICATIONS

This application claims priority to Provisional Patent Application Ser. No. 63/044,606, entitled "ALLREDUCE ENHANCED DIRECT MEMORY ACCESS FUNCTIONALITY", filed Jun. 26, 2020, the entirety of which is incorporated herein by reference.

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others. However, neural networks often use significant amounts of processing and memory resources.

Implementing neural networks on graphics processing units (GPUs) or other parallel processing units (e.g., digital signal processors (DSPs), field programmable gate arrays (FPGAs), application specific integrated circuits (ASICs)) involves loading and processing large amounts of data. Neural networks are often implemented on GPUs due to the rapid increase in the processing power of GPUs. The increase in processing power is, at least in part, due to multiple independent processing units (e.g., single instruction multiple data (SIMD) processors, arithmetic logic units (ALUs)) that are included in a GPU. In a typical application, the multiple independent processing units are utilized to perform parallel computations, calculations, and/or operations. For example, neural network applications can include the same sequence of instructions being executed on multiple parallel data streams to yield a substantial speedup of operations. However, neural network applications also include operations that are not able to be performed in an efficient manner on the traditional processing units of a GPU.

GPUs include structures that support executing multiple instantiations of a kernel. As used herein, the term "kernel" is defined as a function declared in a program. When operating upon multiple data elements, multiple instances of a kernel are executed in parallel on multiple processing elements. Each such instance is referred to as a "thread" or "work-item" of execution. As used herein, the term "work-item" is defined as one of a collection of parallel execution of a kernel invoked on a processing unit by a command. A group of such threads or work-items is also referred to herein as a "warp" or "wavefront". Typically, a GPU kernel has multiple warps or wavefronts.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing an allreduce operation on an enhanced direct memory access (DMA) engine are disclosed herein. In one implementation, a system includes at least a first processor, a second processor, and one or more memory devices accessible by the first and second processors. In one implementation, the first processor launches work to be performed on the second processor. In one implementation, the second processor includes a plurality of compute units as well as one or more enhanced DMA engines. Each enhanced DMA engine can perform one or more arithmetic and/or logical operations on retrieved data prior to storing the data.

In one implementation, the system implements a machine learning application which includes a first kernel and a second kernel. The first kernel corresponds to a first portion of a machine learning model while the second kernel corresponds to a second portion of the machine learning model. The first processor invokes a first kernel on the plurality of compute units and converts a second kernel into a collective communication operation command executable by the enhanced DMA engine. The first kernel is executed on the plurality of compute units in parallel with the enhanced DMA engine executing the collective communication operation command. In one implementation, as a result of implementing the machine learning application, the system generates a classification of an input dataset (e.g., an image). In other implementations, other objectives can be achieved as a result of implementing the machine learning application.

Figure 1:
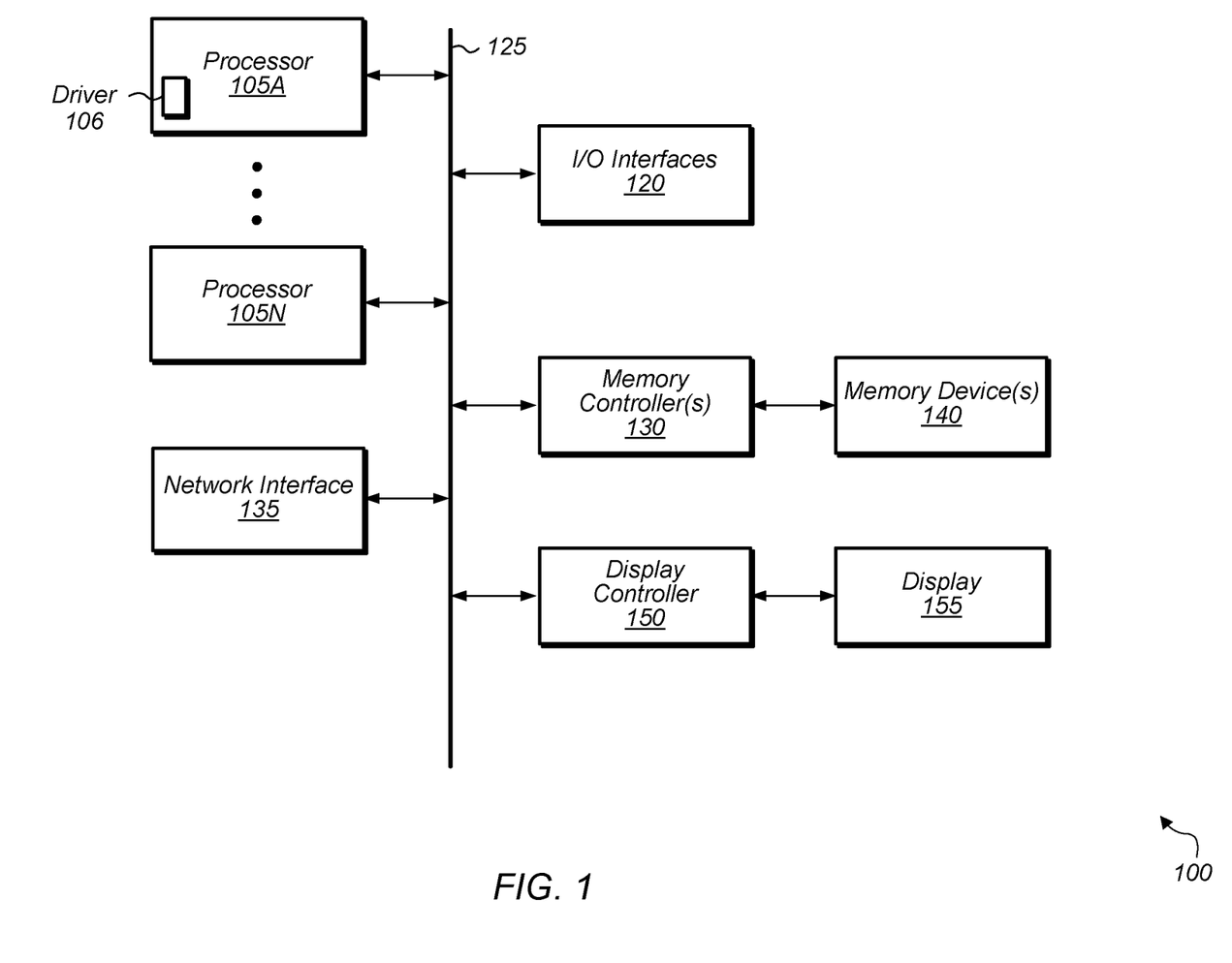
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general-purpose processor, such as a central processing unit (CPU). In this implementation, processor 105A executes a driver 106 (e.g., graphics driver) for controlling the operation of one or more of the other processors in system 100. It is noted that depending on the implementation, driver 106 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

When a neural network is being implemented on multiple GPUs (or on other types of parallel processors), an allreduce operation is typically performed using the compute units of the GPUs. The compute units include the parallel processing resources of the GPU. As used herein, an "allreduce operation" is defined as a reduction operation that combines multiple data inputs into a single data output using an arithmetic and/or logical operator possibly followed by a broadcast of the single data set. In a ring-based allreduce operation, a GPU receives data from a previous node, reduces the received data with its own data, and then sends the reduced data to the next node. Other types of allreduce operations besides ring-based approaches can also be used. In one implementation, for a distributed deep learning application, the gradient of the loss function is computed using a minibatch on each GPU of multiple GPUs. Next, the mean of the gradients is computed and distributed to the GPUs using an allreduce operation. Then, the deep learning model is updated. In other scenarios, other types of applications can be implemented that perform an allreduce operation.

Using the compute units to perform allreduce is inefficient because the compute units are general purpose and could be doing other useful computation. There are also a limited amount of execution resources available, and performing allreduce puts added pressure on the execution resources. Consequently, there is a negative performance impact associated with the traditional allreduce approach. Accordingly, techniques for enabling the execution of an allreduce operation on an enhanced DMA engine, rather than on the GPU's compute units, will be described throughout the remainder of this disclosure.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
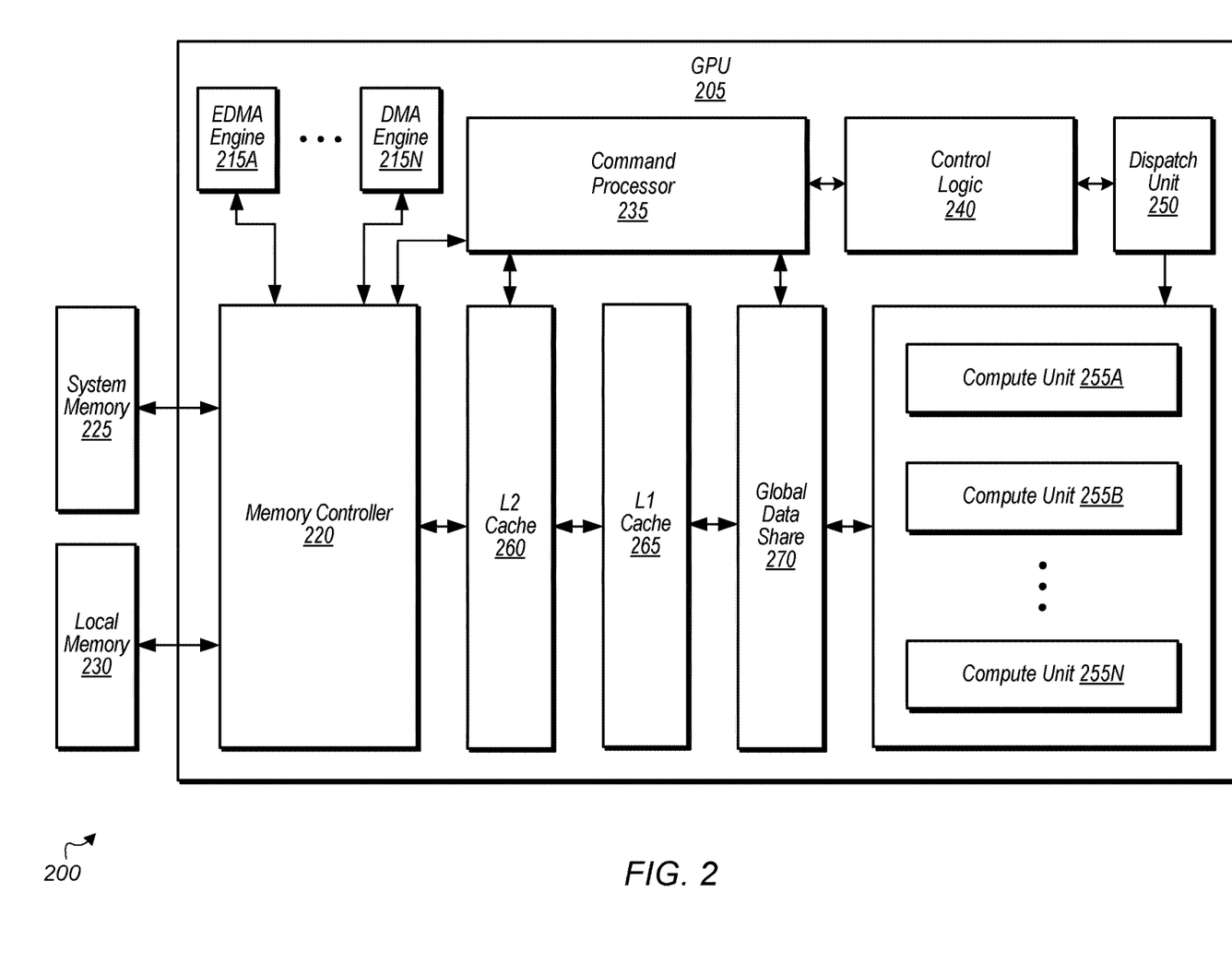
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control logic 240, dispatch unit 250, compute units 255A-N, enhanced DMA (EDMA) engine 215A, DMA engine 215N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, each compute unit 255A-N is a Single Instruction Multiple Data (SIMD) processing core. As referred to herein, a "compute unit" is a pipeline, or programming model, where respective instantiations of the same kernel are executed concurrently. Each processing element in a compute unit executes a respective instantiation of the same kernel. An instantiation of a kernel, along with its associated data, is called a work-item or thread. Thus, a kernel is the code for a work-item, and a work-item is the basic unit of work on a compute unit. All instantiations of a kernel executing on compute units 255A-N comprise a global domain of work-items. This global domain of work-items can represent the entire computation domain, and a work-item within the computation domain represents a particular task to be performed. In order to simplify execution of work-items on GPU 205, work-items are grouped together into wavefronts. A wavefront is a collection of related work-items that execute together on a single compute unit.

In parallel with command processor 235 launching wavefronts on compute units 255A-N, enhanced DMA engine 215A performs various DMA operations along with additional arithmetic and/or logical operations on the data retrieved during the DMA operations. It is noted that DMA engines 215A-N are representative of any number of DMA engines. DMA engines 215A-N can include any number of enhanced DMA engines as well as any number of regular DMA engines. While enhanced DMA engine 215A and regular DMA engine 215N each include traditional DMA control logic, enhanced DMA engine 215A also include an arithmetic logic unit (ALU) for performing arithmetic and/or logical operations on the retrieved data. For example, the ALU can perform one or more of addition, multiplication, maximum, minimum, reduction, average, XOR, and/or other operations.

Figure 3:
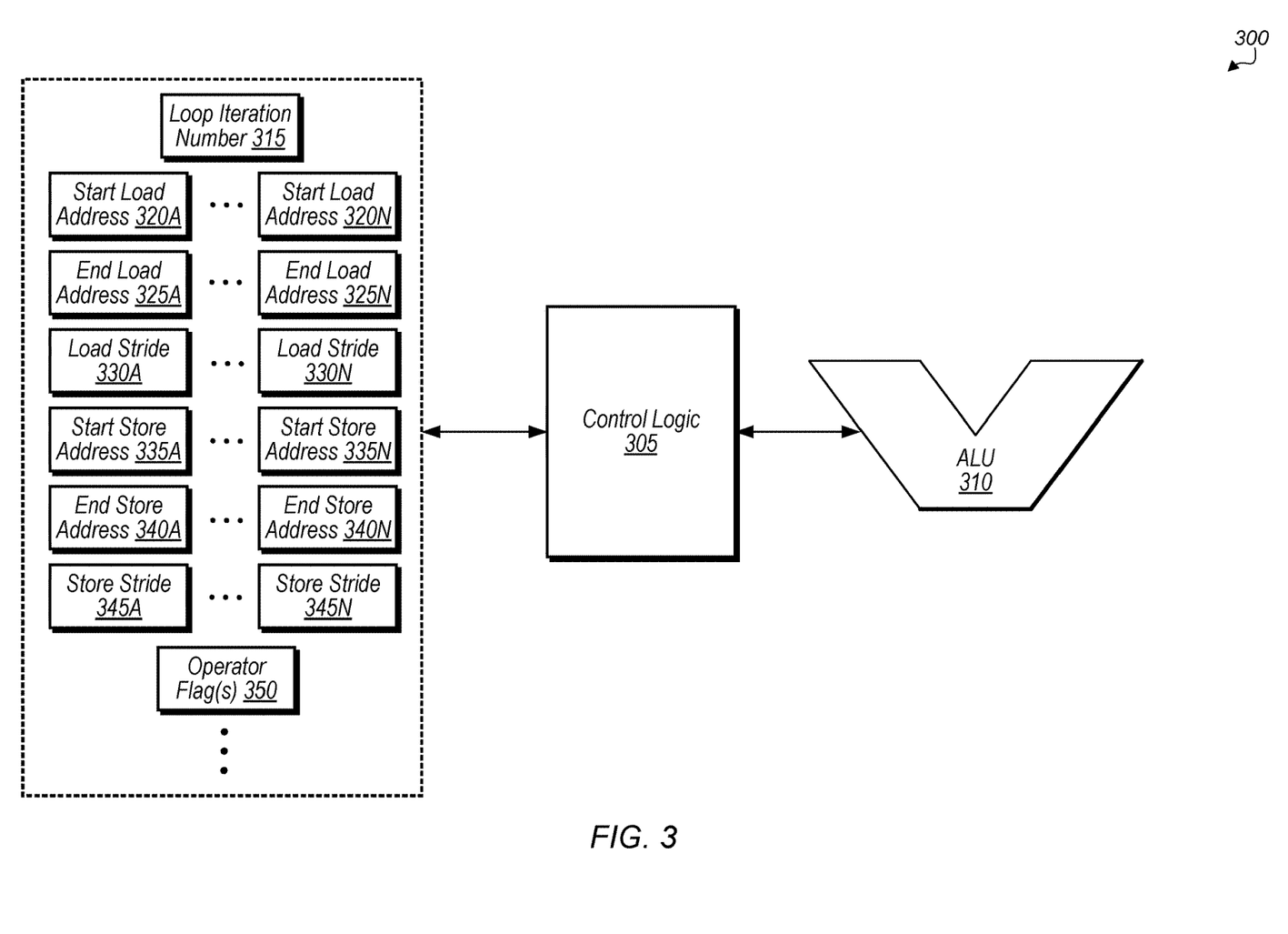
FIG. 3 is a block diagram of one implementation of an enhanced DMA engine.

Referring now to FIG. 3, a block diagram of one implementation of an enhanced DMA engine 300 is shown. Enhanced DMA engine 300 includes at least control logic 305 and arithmetic logic unit (ALU) 310. In one embodiment, the components of enhanced DMA engine 300 are included within enhanced DMA engine 215A (of FIG. 2). The operation of control logic 305 and ALU 310 is determined based on the values of various control parameters such as loop iteration number 315, start load addresses 320A-N, end load addresses 325A-N, load strides 330A-N, start store addresses 335A-N, end store addresses 340A-N, store strides 345A-N, operator flag(s) 350, and other parameters. In one implementation, these parameters are set based on data values and/or flags associated with one or more commands stored in a queue in memory, stored in a register associated with enhanced DMA engine 300, or stored in another location by a CPU, GPU, or other device. It should be understood that the list of parameters shown in FIG. 3 is merely representative of one particular implementation. In other implementations, other types of parameters than those shown in FIG. 3 can be programmed by an external device and used by enhanced DMA engine 300.

In one implementation, control logic 305 includes a state machine and logic for generating read and write commands. The state machine implements a loop for a number of specified iterations. Control logic 305 is also coupled to ALU 310 for performing any of various arithmetic and/or logical operations on retrieved data. A traditional DMA engine (e.g., DMA engine 215N of FIG. 2) would typically include control logic 305 but not ALU 310. In one implementation, commands received by enhanced DMA engine 300 include flags specifying which arithmetic and/or logical operations to perform on the retrieved data. These operations can include, but are not limited to, addition, multiplication, maximum value, averaging, reduction, XOR, and others. In one implementation, these operations can be performed as part of a machine learning algorithm. For example, in one embodiment, while the compute units of a processor (e.g., GPU 205 of FIG. 2) are executing compute kernels of the machine learning algorithm, enhanced DMA engine 300 performs an allreduce operation of the machine learning algorithm.

In one implementation, loop iteration number 315 stores the number of times the loop should be iterated by control logic 305. Start load addresses 320A-N and end load addresses 325A-N specify the start and end addresses, respectively, of locations from which to load data. Load strides 330 specify a stride or pattern of addresses from which data is loaded for each separate set of load addresses. Any number of sets of load addresses can be specified, from 1 to N, where N is a positive integer greater than 1. Start store addresses 335A-N and end store addresses 340A-N specify the start and end addresses, respectively, of where data should be stored. Store strides 345A-N specify a stride or pattern of addresses at which data is stored for each separate set of store addresses. Any number of sets of store addresses can be specified, from 1 to N. Operator flag(s) 350 specify the arithmetic and/or logical operations that ALU 310 should perform on the loaded data. These operations can include, but are not limited to, addition, multiplication, maximum, reduction, average, XOR, and/or other operations. In one implementation, if a first operator flag 350 is set, ALU 310 performs a reduce operation to load a plurality of values from an input array and store the output in a single memory location. In other implementations, other operator flag(s) 350 can be set to specify other types of operations (e.g., reduce-scatter) to be performed.

Depending on the implementation, ALU 310 can include different type of units to perform operations on different types of operands. For example, in one implementation, ALU 310 can include units which can perform operations on 32-bit integers, 64-bit integers, 32-bit floating point numbers, and 64-bit floating point numbers. In other implementations, ALU 310 can include units for performing operations on operands which are stored in other types of formats. For example, formats that can be specified include, but are not limited to, bitfield, signed integer, unsigned integer, characters, standard floating-point (e.g., Institute of Electrical and Electronics Engineers (IEEE) 754 floating point), custom floating point, fixed-point fractions, a bit-width field, and/or combinations of multiple values (e.g., complex data types with a real component and an imaginary component). It is noted that enhanced DMA engine 300 represents one particular type of an enhanced DMA engine that can be implemented. Other types of enhanced DMA engines with other components and/or structured in other suitable manners are possible and are contemplated.

Figure 4:
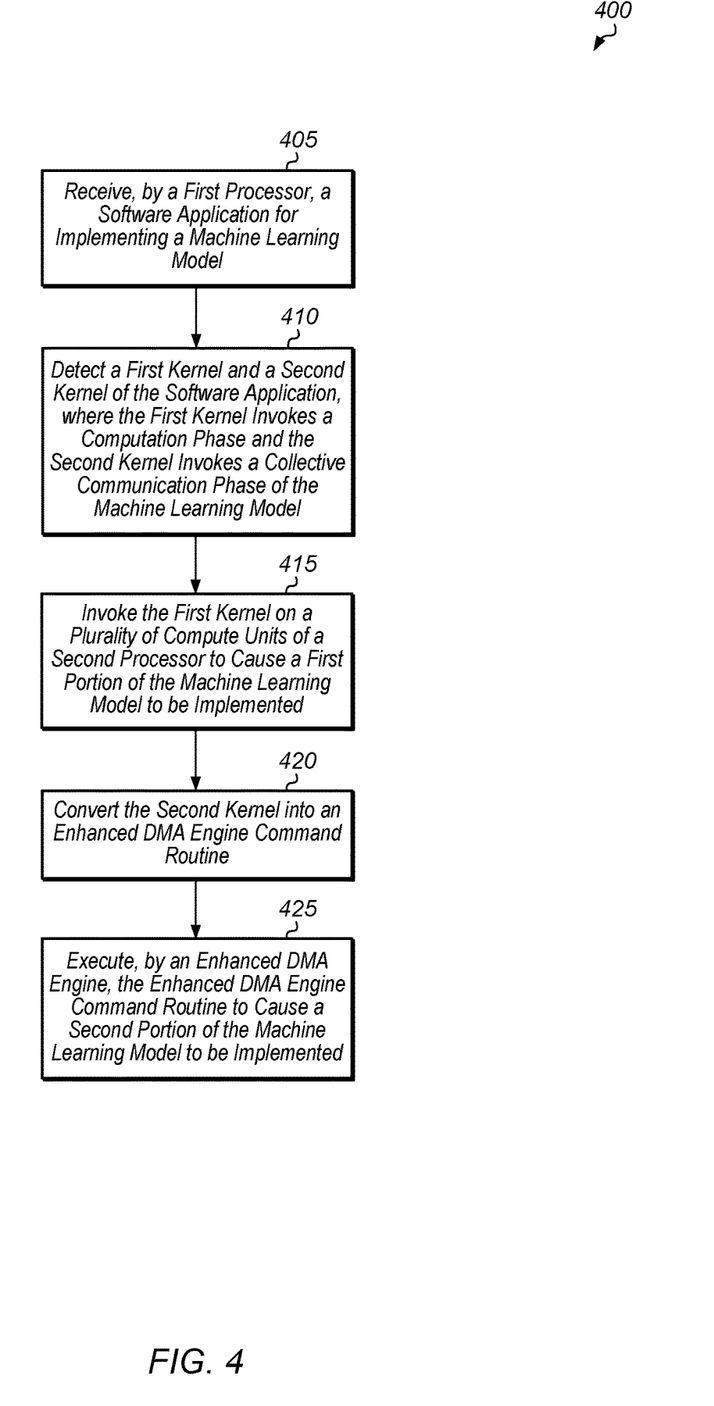
FIG. 4 is a generalized flow diagram illustrating one implementation of a method for efficiently executing a machine learning model.

Turning now to FIG. 4, one implementation of a method 400 for efficiently executing a machine learning model is shown. For purposes of discussion, the steps in this implementation and those of FIG. 5-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A first processor receives a software application for implementing a machine learning model (block 405). The first processor detects a first kernel and a second kernel of the software application, where the first kernel involves a computation phase and the second kernel involves a collective communication phase of the machine learning model (block 410). In response to detecting the first kernel, the first processor invokes the first kernel on a plurality of compute units of a second processor to cause a first portion of the machine learning model to be implemented (block 415). In response to detecting the second kernel, the first processor converts the second kernel into an enhanced DMA engine command routine (block 420). In other words, the first processor converts the second kernel into one or more commands which are executable on the enhanced DMA engine. Next, the enhanced DMA engine executes the enhanced DMA engine command routine to cause a second portion of the machine learning model to be implemented (block 425).

In one implementation, the second portion of the machine learning model involves performing an allreduce operation. For example, in this implementation, the first portion of machine learning model involves computing updates to the machine learning model (i.e., gradients). The first portion can be performed across multiple processors. In this implementation, the second portion of the machine learning model involves exchanging the gradients among the multiple processors. Next, a sum of the gradients is computed and then an average gradient is calculated from the sum. In other implementations, the second portion of the machine learning model involves performing other types of operations. It is noted that blocks 415 and 425 are performed in parallel so that the compute units are performing the computation phase while the enhanced DMA engine is simultaneously performing the collective communication phase. After blocks 415 and 425, method 400 ends. By performing method 400, the machine learning model is implemented more efficiently on the computing system by distributing the workload between the compute units and the enhanced DMA engine rather than implementing both first and second kernels on the compute units.

Figure 5:
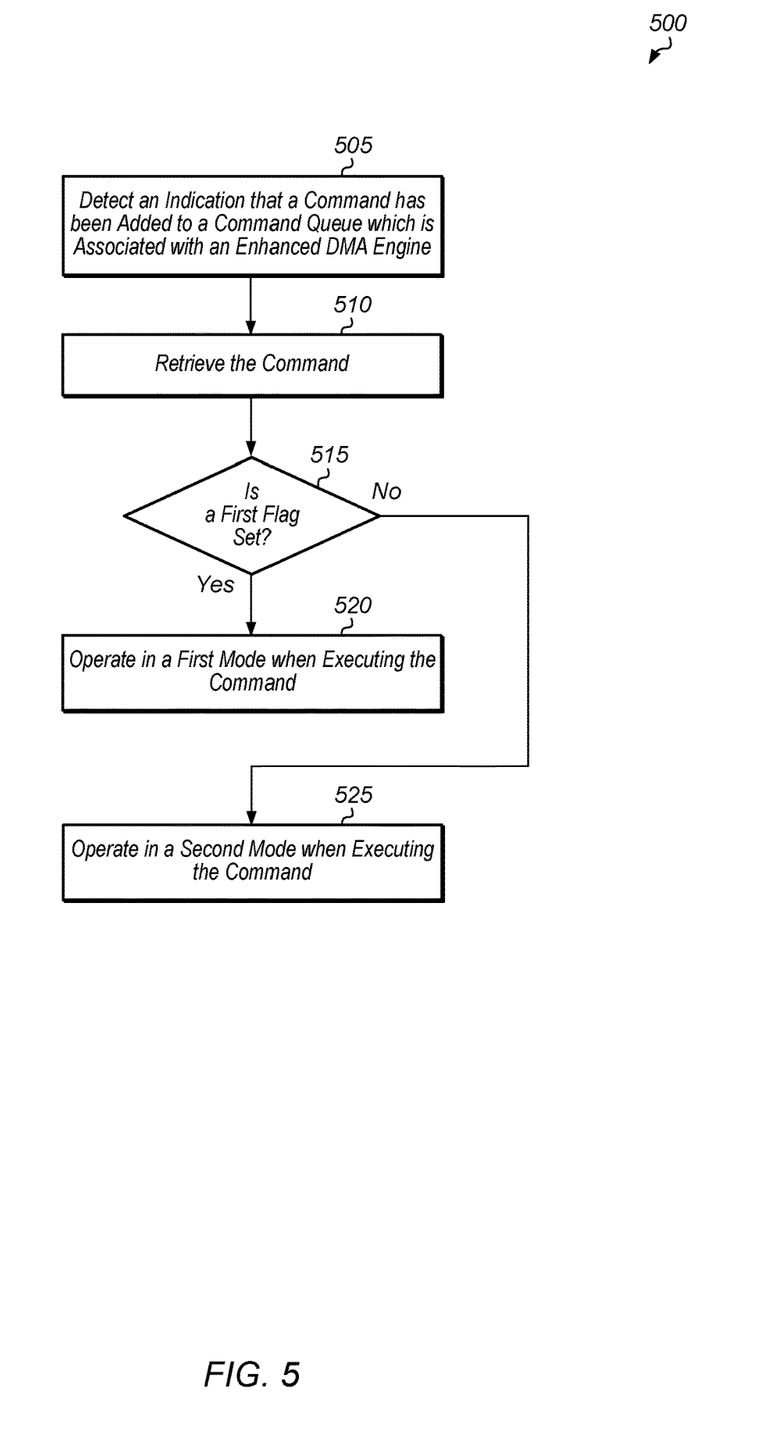
FIG. 5 is a generalized flow diagram illustrating one implementation of a method for operating a multi-mode enhanced DMA engine.

Referring now to FIG. 5, one implementation of a method 500 for operating a multi-mode enhanced DMA engine is shown. An enhanced DMA engine detects an indication that a command has been added to a command queue which is associated with the enhanced DMA engine (block 505). The indication can be generated and detected in a variety of different manners. For example, in one implementation, the enhanced DMA engine monitors the command queue to detect new commands. In another implementation, a device (e.g., CPU) writing the command to the command queue sends a wake-up signal to the enhanced DMA engine. In other implementations, other mechanisms can be used for detecting that a command has been added to the command queue.

In response to detecting the indication, the enhanced DMA engine retrieves the command (block 510). If a first flag is set in the retrieved command (conditional block 515, "yes" leg), then the enhanced DMA engine operates in a first mode when executing the command (block 520). In one implementation, the first mode involves performing an operation on data in between reading the data from a first location and writing the data to a second location. In other implementations, the first mode can involve other types of actions. If the first flag is not set in the retrieved command (conditional block 515, "no" leg), then the enhanced DMA engine operates in a second mode when executing the command (block 525). In one implementation, the second mode involves performing a traditional DMA operation by copying data from a first location to a second location. After blocks 520 and 525, method 500 ends.

Figure 6:
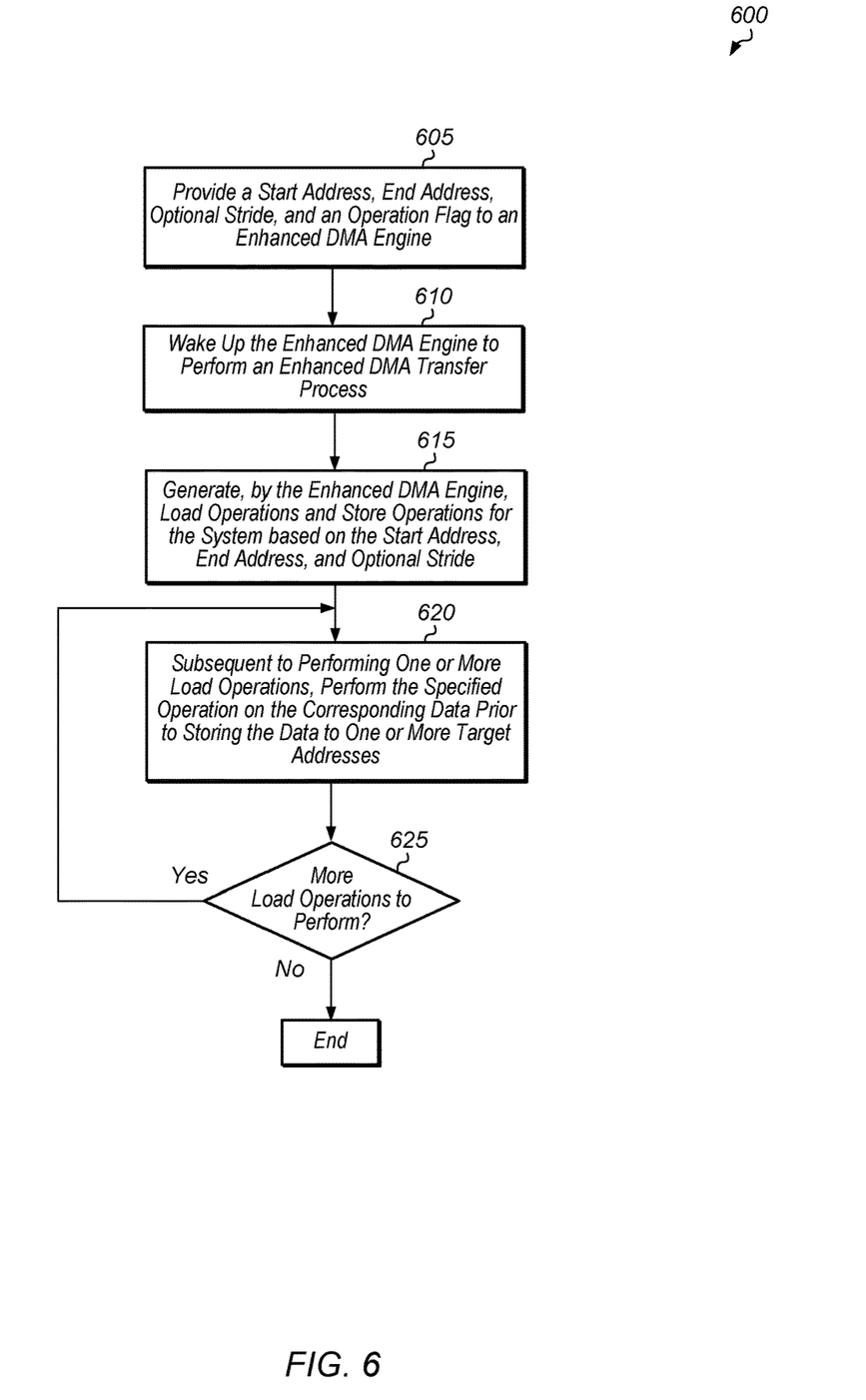
FIG. 6 is a generalized flow diagram illustrating one implementation of a method for operating an enhanced DMA engine.

Turning now to FIG. 6, one implementation of a method 600 for operating an enhanced DMA engine is shown. A processor provides a start address, end address, optional stride, and an operation flag to an enhanced DMA engine (block 605). The processor can also provide other parameters (e.g., iteration number) to the enhanced DMA engine. The operation flag specifies a mathematical or logical operation to perform on the data being loaded. Then, the enhanced DMA engine is woken up to perform an enhanced DMA transfer process (block 610). In response to being woken up, the enhanced DMA engine generates load operations and store operations for the system based on the start address, end address, and optional stride (block 615).

Subsequent to performing one or more load operations, the enhanced DMA engine performs the specified operation on the corresponding data prior to storing the data to one or more target addresses (block 620). In one implementation, the specified operation is a reduction operation. In another implementation, the specified operation is a compare-and-swap operation, and the compare-and-swap operation takes in multiple input values, compares them, and then optionally swaps multiple input values with multiple separate output locations. In other implementations, other operations can be performed in block 620. If all load operations have been performed (conditional block 625, "no" leg), then method 600 ends. Otherwise, if there are more load operations to perform (conditional block 625, "yes" leg), then method 600 returns to block 620.

Figure 7:
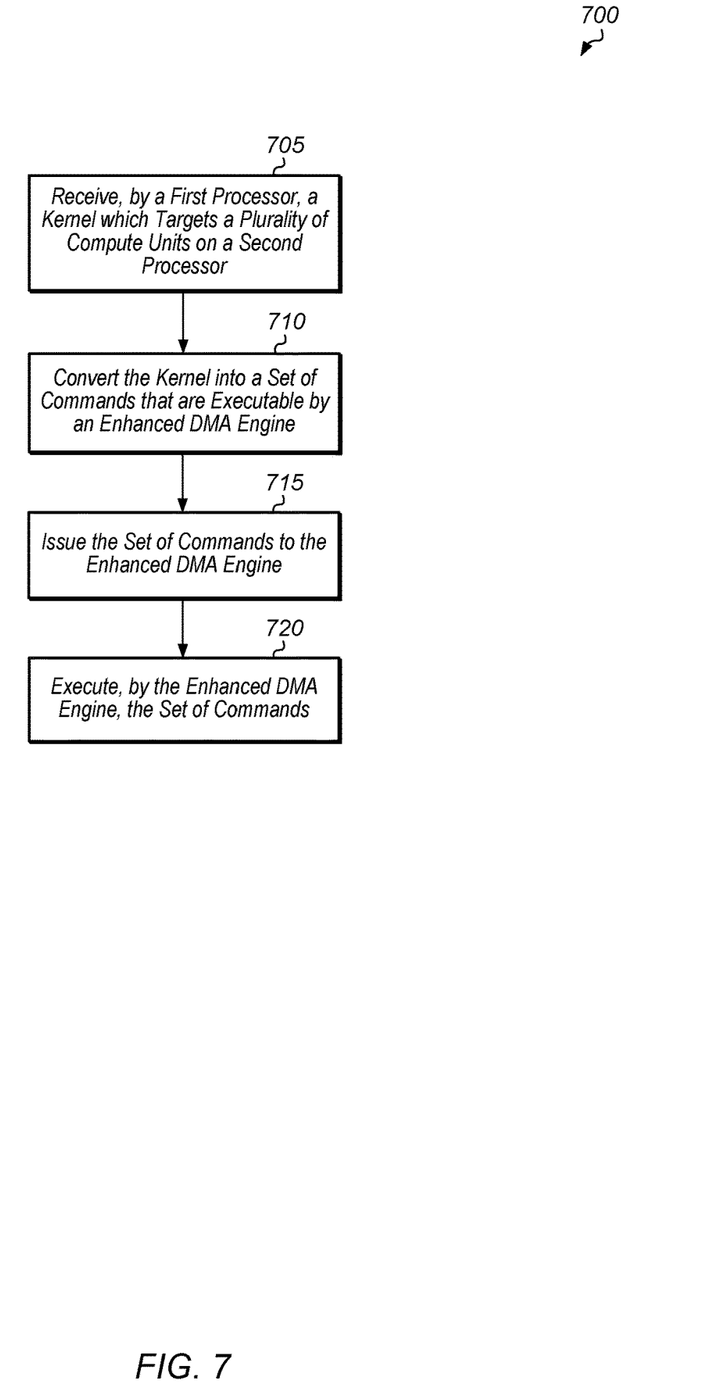
FIG. 7 is a generalized flow diagram illustrating one implementation of a method for converting a kernel into an alternative type of executable.

Referring now to FIG. 7, one implementation of a method 700 for converting a kernel into an alternative type of executable is shown. A first processor receives a kernel which targets a plurality of compute units on a second processor (block 705). Rather than dispatching the kernel to the plurality of compute units, the first processor converts the kernel into a set of commands that are executable by an enhanced DMA engine (block 710). Then, the first processor issues the set of commands to the enhanced DMA engine (block 715). Next, the enhanced DMA engine executes the set of commands (block 720). After block 720, method 700 ends. By performing method 700, the original application does not need to be modified by the programmer to target a system with an enhanced DMA engine. Rather, existing applications can be converted during run-time by the first processor for systems employing enhanced DMA engines.

Figure 8:
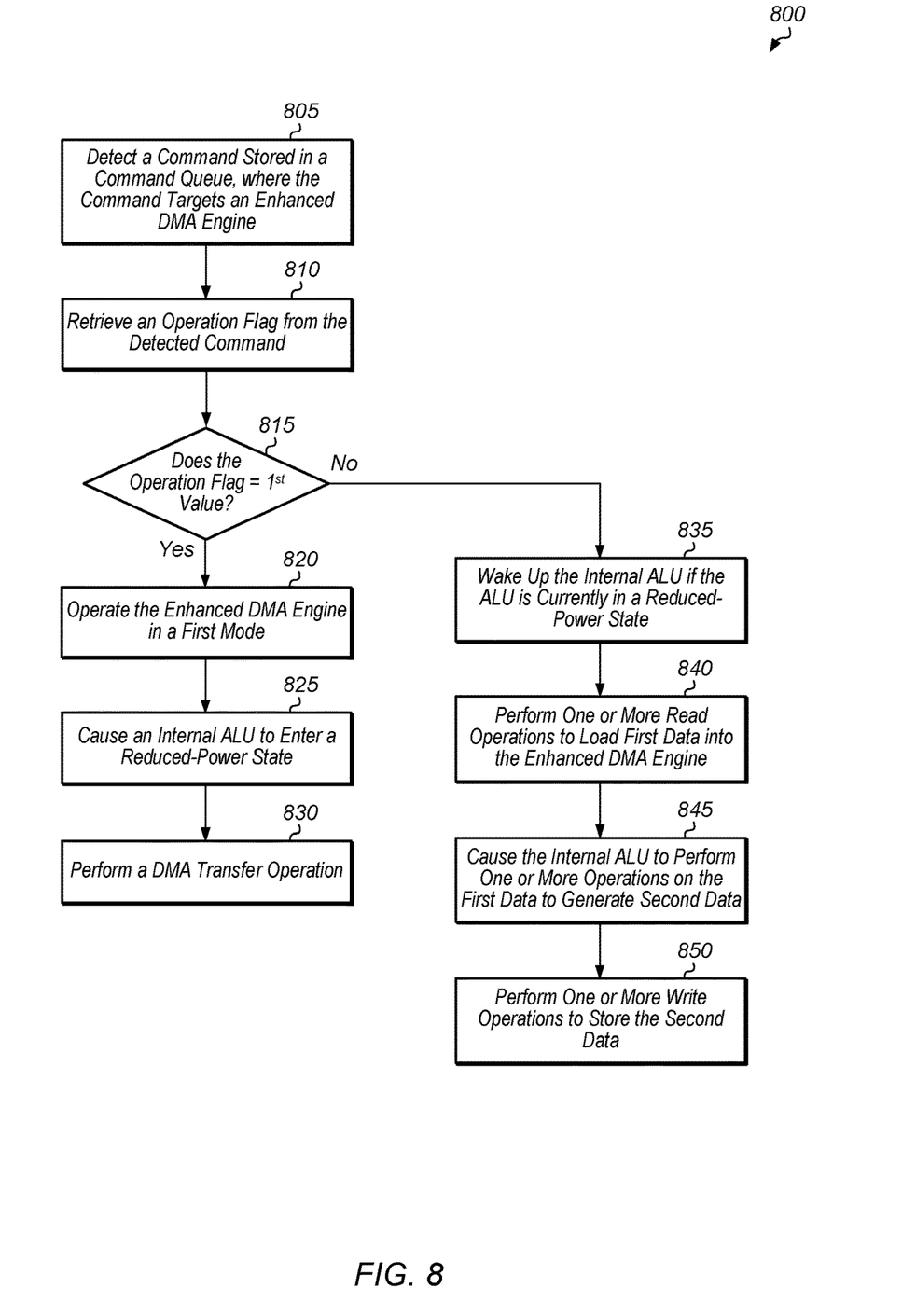
FIG. 8 is a generalized flow diagram illustrating one implementation of a method for operating an enhanced DMA engine.

Turning now to FIG. 8, one implementation of a method 800 for operating an enhanced DMA engine is shown. The enhanced DMA engine detects a command stored in a command queue, where the command targets the enhanced DMA engine (block 805). The enhanced DMA engine retrieves an operation flag from the detected command (block 810). If the operation flag has a first value (conditional block 815, "yes" leg), then the enhanced DMA engine operates in a first mode (block 820). While operating in the first mode, the enhanced DMA engine causes an internal ALU to enter a reduced-power state (block 825). Also, control logic of the enhanced DMA engine performs a DMA transfer operation (block 830). It is noted that a DMA transfer operation refers to a traditional DMA operation where data is copied from one or more first locations to one or more second locations without any operations being performed on the data. After block 830, method 800 ends.

If the operation flag has a second value (conditional block 815, "second" leg), then the enhanced DMA engine wakes up the internal ALU if the ALU is currently in a reduced-power state (block 835). Also, control logic of the enhanced DMA engine performs one or more read operations to load first data into the enhanced DMA engine (block 840). Next, the control logic of the enhanced DMA engine causes the internal ALU to perform one or more operations on the first data to generate second data (block 845). It is noted that in one implementation, the command includes a data-type flag which specifies a data format of operands of the first data being operated on by the ALU. For example, the data-type flag specifies integer or floating-point in one implementation. In another implementation, the data-type flag also specifies a precision of the data format (e.g., single-precision floating point, double-precision floating point). After block 845, the control logic of the enhanced DMA engine performs one or more write operations to store the second data (block 850). After block 850, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An enhanced direct memory access (DMA) engine comprising:
    an arithmetic logic unit (ALU); and
    control logic comprising circuitry configured to:
        detect a command that identifies an operation, wherein the command corresponds to a kernel converted into one or more commands executable by the enhanced DMA;
        perform a DMA transfer operation, comprising at least a read operation to a memory to load data into the enhanced DMA engine, responsive to an operation flag in the command having a first value; and
        responsive to the operation flag in the command has having a second value:
            perform one or more read operations to the memory to load first data comprising multiple data inputs into the enhanced DMA engine;
            cause the ALU to combine the multiple data inputs into a single data output; and
            convey the single data output.

2. The enhanced DMA engine as recited in claim 1, wherein when the operation flag has the second value, the command includes a field specifying the one or more read operations to be performed by the ALU.

3. The enhanced DMA engine as recited in claim 1, wherein the control logic operates in a first mode when the operation flag has the first value, and wherein the control logic operates in a second mode when the operation flag has the second value.

4. The enhanced DMA engine as recited in claim 1, wherein the kernel targets a plurality of compute units of a processor.

5. The enhanced DMA engine as recited in claim 1, wherein the enhanced DMA engine is configured to broadcast the single data output.

6. The enhanced DMA engine as recited in claim 1, wherein the command includes a data-type flag which specifies a data format of operands being operated on by the ALU.

7. The enhanced DMA engine as recited in claim 6, wherein the data-type flag specifies one or more of bitfield, signed integer, unsigned integer, characters, standard floating-point, custom floating point, fixed-point fractions, bit-width, and/or combinations of multiple values.

8. A method comprising:
    detecting, by circuitry of an enhanced direct memory access (DMA) engine, a command that identifies an operation, wherein the command corresponds to a kernel converted into one or more enhanced DMA commands;
    performing a DMA transfer operation, comprising at least a read operation to a memory to load data into the enhanced DMA engine, responsive to an operation flag in the command having a first value;
    responsive to the operation flag in the command having a second value, the circuitry of the enhanced DMA engine:
        performing one or more read operations to load first data comprising multiple data inputs into the enhanced DMA engine;
        causing an arithmetic logic unit (ALU) to combine the multiple data inputs into a single data output; and
        conveying the single data output.

9. The method as recited in claim 8, wherein when the operation flag has the second value, the command includes a field specifying the one or more read operations to be performed by the ALU.

10. The method as recited in claim 8, further comprising:
    operating in a first mode when the operation flag has the first value; and
    operating in a second mode when the operation flag has the second value.

11. The method as recited in claim 8, wherein the command corresponds to a collective communication phase of a machine learning model.

12. The method as recited in claim 8, further comprising broadcasting the single data output.

13. The method as recited in claim 8, wherein the command includes a data-type flag which specifies a data format of operands being operated on by the ALU.

14. The method as recited in claim 13, wherein the data-type flag specifies one or more of bitfield, signed integer, unsigned integer, characters, standard floating-point, custom floating point, fixed-point fractions, bit-width, and/or combinations of multiple values.

15. A system comprising:
    a plurality of compute units comprising circuitry configured to execute a given workload; and
    an enhanced direct memory access (DMA) engine comprising circuitry configured to:

detect a command targeting the enhanced DMA engine, wherein the command corresponds to a kernel converted into one or more commands executable by the enhanced DMA;

perform a DMA transfer operation, comprising at least a read operation to a memory to load data into the enhanced DMA engine, responsive to an operation flag in the command having a first value; and responsive to the operation flag in the command having a second value:

perform one or more read operations to the memory to load first data comprising multiple data inputs into the enhanced DMA engine;

combine the multiple data inputs into a single data output; and     convey the single data output.

16. The system as recited in claim 15, wherein when the operation flag has the second value, the command includes a field specifying the one or more read operations to be performed.

17. The system as recited in claim 16, wherein the enhanced DMA engine operates in a first mode when the operation flag has the first value, and wherein the enhanced DMA engine operates in a second mode when the operation flag has the second value.

18. The system as recited in claim 17, wherein the enhanced DMA engine causes an ALU to enter a reduced-power state when operating in the first mode.

19. The system as recited in claim 15, wherein the enhanced DMA engine is configured to broadcast the single data output.

20. The system as recited in claim 15, wherein the command includes a data-type flag which specifies a data format of operands being operated on by the enhanced DMA engine.

* * * * *

UNITED STATES PATENT AND TRADEMARK OFFICE
CERTIFICATE OF CORRECTION

| | |
|---|---|
| PATENT NO. | : 11,669,473 B2 |
| APPLICATION NO. | : 17/032195 |
| DATED | : June 6, 2023 |
| INVENTOR(S) | : Vishnu et al. |

It is certified that error appears in the above-identified patent and that said Letters Patent is hereby corrected as shown below:

In the Claims

Column 9, Claim 1, Line 56 & 57, please delete "command has having a" and substitute -- command having a --.

Signed and Sealed this
Eighth Day of August, 2023

Katherine Kelly Vidal
*Director of the United States Patent and Trademark Office*